(12) United States Patent
Aaron

(10) Patent No.: US 7,974,241 B2
(45) Date of Patent: Jul. 5, 2011

(54) METHODS, SYSTEMS, AND COMPUTER-READABLE MEDIA FOR PROVIDING CELLULAR HANDOFF

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 947 days.

(21) Appl. No.: 11/864,209

(22) Filed: Sep. 28, 2007

(65) Prior Publication Data

US 2009/0088157 A1   Apr. 2, 2009

(51) Int. Cl.
*H04W 4/00*   (2009.01)
(52) U.S. Cl. ........ 370/331; 370/328; 370/335; 370/338; 370/395.21; 455/405; 455/436; 455/453; 455/456.3
(58) Field of Classification Search .......... 370/328, 370/329, 331, 335, 338, 395.21; 455/405, 455/432, 436, 446, 453, 456, 456.3
See application file for complete search history.

(56) References Cited

U.S. PATENT DOCUMENTS

| | | | | |
|---|---|---|---|---|
| 5,633,868 A * | 5/1997 | Baldwin et al. | | 370/331 |
| 5,633,873 A * | 5/1997 | Kay et al. | | 370/336 |
| 5,664,004 A * | 9/1997 | Durchman et al. | | 455/466 |
| 6,490,452 B1 * | 12/2002 | Boscovic et al. | | 455/436 |
| 6,801,519 B1 * | 10/2004 | Mangal | | 370/349 |
| 6,954,616 B2 * | 10/2005 | Liang et al. | | 455/63.1 |
| 6,980,809 B2 * | 12/2005 | Western | | 455/450 |
| 7,301,950 B1 * | 11/2007 | Cheong et al. | | 370/395.21 |
| 7,313,628 B2 * | 12/2007 | Chaskar et al. | | 709/238 |
| 7,369,492 B2 * | 5/2008 | Shimizu | | 370/230 |
| 7,400,886 B2 * | 7/2008 | Sahim et al. | | 455/444 |
| 7,471,655 B2 * | 12/2008 | Gallagher et al. | | 370/329 |
| 7,483,710 B2 * | 1/2009 | Kitazawa et al. | | 455/522 |
| 7,680,079 B2 * | 3/2010 | Jeong et al. | | 370/331 |
| 2001/0007819 A1 * | 7/2001 | Kubota | | 455/439 |
| 2006/0084445 A1 * | 4/2006 | Minami et al. | | 455/452.1 |
| 2007/0147320 A1 * | 6/2007 | Sattari et al. | | 370/338 |
| 2007/0147388 A1 * | 6/2007 | Kim et al. | | 370/395.21 |
| 2008/0039090 A1 * | 2/2008 | Jin et al. | | 455/436 |
| 2008/0161001 A1 * | 7/2008 | Holcman et al. | | 455/436 |
| 2008/0311909 A1 * | 12/2008 | Taaghol et al. | | 455/436 |
| 2009/0239536 A1 * | 9/2009 | Fallgren et al. | | 455/436 |
| 2010/0062787 A1 * | 3/2010 | Yoshiuchi et al. | | 455/452.2 |

* cited by examiner

*Primary Examiner* — Ayza R Sheikh
*Assistant Examiner* — Andrew C Lee
(74) *Attorney, Agent, or Firm* — Hope Baldauff Hartman, LLC

(57) ABSTRACT

Methods, systems, and computer-readable media provide for providing cellular handoff. According to embodiments, a method for providing a cellular handoff is provided. According to the method, a first group of users is associated with a first class of service and a first cellular tower. A second group of users is associated with a second class of service. Whether to hand off the first group of users from the first cellular tower to a second cellular tower is determined based on real-time quality of service provided to at least one of the first group of users and the second group of users. In response to determining to hand off the first group of users from the first cellular tower to the second cellular tower, a handoff of the first group of users from the first cellular tower to the second cellular tower is performed.

11 Claims, 4 Drawing Sheets

METHODS, SYSTEMS, AND COMPUTER-READABLE MEDIA FOR PROVIDING CELLULAR HANDOFF

TECHNICAL FIELD

This application relates generally to the field of quality of service. More specifically, the disclosure provided herein relates to the field of cellular-related quality of service.

BACKGROUND

Cellular-related quality of service ("QoS") issues are a significant source of frustration for service providers as well as their customers. Common QoS issues include bandwidth limitations, jitter, delay and latency, packet loss, and interference. QoS issues may result in a number of QoS problems for customers, potentially causing customers to change service providers. In one example, a customer may experience a "dropped call," in which a phone call unexpectedly ends. In another example, a customer may experience a slow data transfer rate that is not suitable for transferring high-bandwidth content, such as video and music. In yet another example, a customer may experience unacceptable quality of service, causing customer dissatisfaction ranging from annoyance to anger.

The QoS problems may be exacerbated in that conventional cellular technology is generally optimized for voice. However, cellular technology is frequently improving to further enable the transmission of high-bandwidth content and other new services and applications in addition to voice. Many of these new services and applications are sensitive to QoS issues. As a result, the QoS problems are likely to increase and may become more challenging to resolve.

SUMMARY

Embodiments of the disclosure presented herein include methods, systems, and computer-readable media for providing cellular handoff. According to one aspect, a method for providing cellular handoff is provided. According to the method, a first group of users is associated with a first class of service and a first cellular tower. A second group of users is associated with a second class of service. Whether to hand off the first group of users from the first cellular tower to a second cellular tower is determined based on real-time quality of service provided to at least one of the first group of users and the second group of users. In response to determining to hand off the first group of users from the first cellular tower to the second cellular tower, a handoff of the first group of users from the first cellular tower to the second cellular tower is performed.

According to another aspect, a system for providing cellular handoff is provided. The system includes a memory and a processor functionally coupled to the memory. The memory stores a program containing code for providing the cellular handoff. The processor is responsive to computer-executable instructions contained in the program and operative to associate a first group of users with a first class of service and a first cellular tower, associate a second group of users with a second class of service, determine whether to hand off the first group of users from the first cellular tower to a second cellular tower based on real-time quality of service provided to at least one of the first group of users and the second group of users, and in response to determining to hand off the first group of users from the first cellular tower to the second cellular tower, perform a handoff of the first group of users from the first cellular tower to the second cellular tower.

According to yet another aspect, a computer-readable medium having instructions stored thereon for execution by a processor to perform a method for providing cellular handoff is provided. According to the method, a first group of users is associated with a first class of service and a first cellular tower. A second group of users is associated with a second class of service. Whether to hand off the first group of users from the first cellular tower to a second cellular tower is determined based on real-time quality of service provided to at least one of the first group of users and the second group of users. In response to determining to hand off the first group of users from the first cellular tower to the second cellular tower, a handoff of the first group of users from the first cellular tower to the second cellular tower is performed.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing cellular handoff. In the following detailed description, references are made to the accompanying drawings that form a part hereof, and which are shown by way of illustration through specific embodiments or examples.

As a user moves across a number of cells, handoff commonly occurs whereby a tower in one cell may "hand off" the user to another tower in another cell. In other cases, the user's cellular device may participate in the handoff decision and/or even select the new tower to which it will connect. One conventional handoff technique is grounded on the misconception that choosing the nearest tower will always provide adequate quality of service ("QoS") for any given user. Another conventional handoff technique involves handing off the user to a tower with the highest signal strength (e.g., signal to noise ratio). However, these conventional techniques are generally simplified to account for only one user at a time without any regards to the QoS for other users and are optimized specifically for voice calls rather than other applications which may be sensitive or vulnerable to various QoS conditions is different ways. For example, a user may be handed off to a cell that has a strong signal but includes a large number of users, thereby causing a heavy load on the tower. As a result, the QoS provided by the tower to at least some of those users, particularly those who may desire and/or expect higher QoS and higher bandwidth, may decrease either due to insufficient bandwidth and/or to other QoS conditions. The QoS may be affected by any suitable QoS conditions including, but are not limited to, bandwidth limitations, jitter, delay and latency, packet loss, and interference.

A cellular device (e.g., a cellular phone) generally can produce and obtain sufficient signal strength to communicate with one of a plurality of towers, particularly in metropolitan areas where cells tend to be smaller in size. It is under this notion that embodiments described herein provide for QoS-based cellular handoff. In one example, a group of users may be forced or encouraged to handoff from a first tower to a second tower to improve the QoS conditions for other users who remain associated with the first tower. In a further example, a group of users may be forced or encouraged to handoff from the first tower to the second tower because the second tower provides better QoS conditions for the group of users than the first tower. As used herein, forcing a handoff may refer to directly causing the handoff to occur, while encouraging a handoff may refer to some degree of a change to a handoff mechanism or process such that the likelihood of the handoff is increased to some relative degree.

Figure 1A:
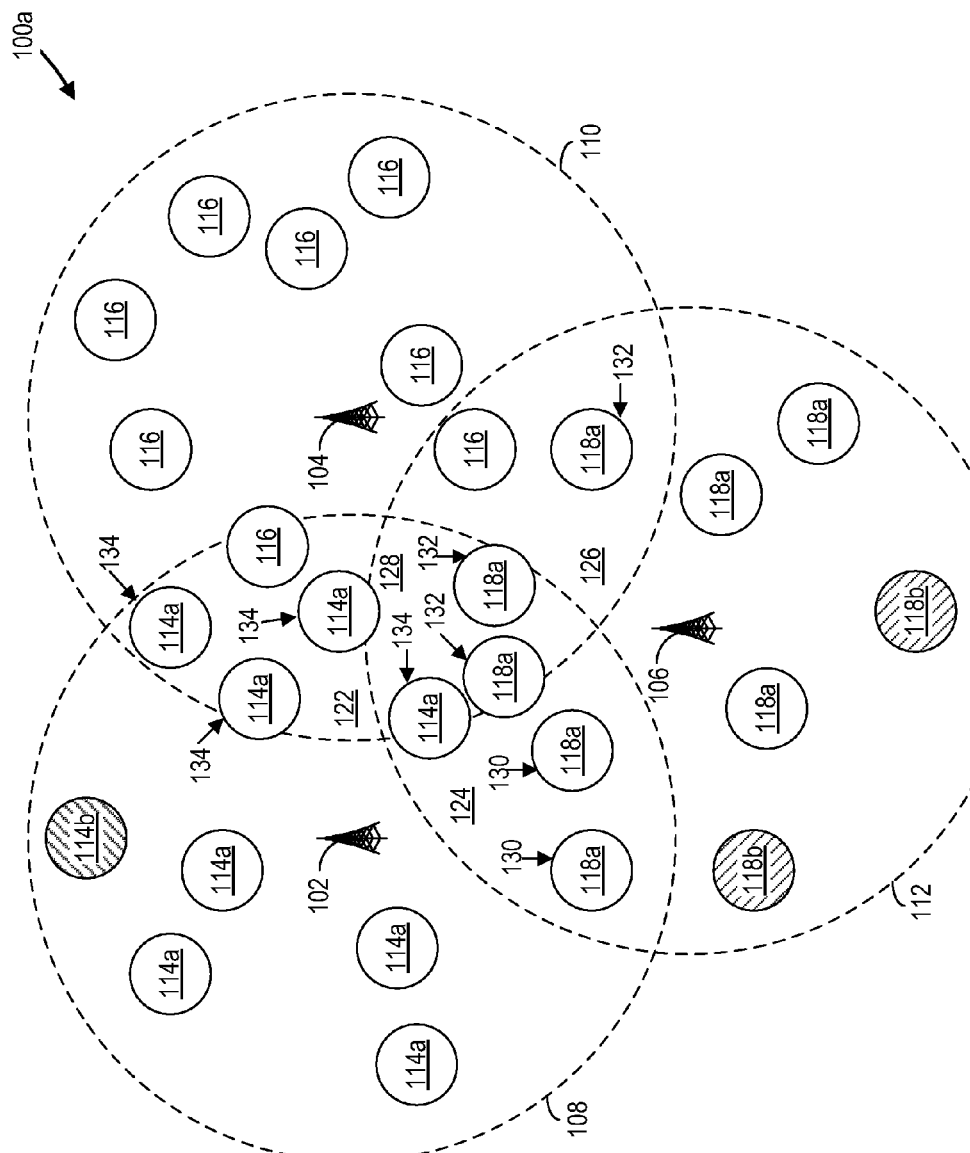
FIG. 1A is a high-level diagram illustrating an exemplary configuration of towers, cells, and users prior to a cellular handoff illustrated in FIGS. 2 and 3.

Referring now to the drawings, it is to be understood that like numerals represent like elements through the several figures, and that not all components and/or steps described and illustrated with reference to the figures are required for all embodiments. FIG. 1A is a diagram illustrating an exemplary configuration 100a of towers 102, 104, 106, cells 108, 110, 112, and users 114a, 114b, 116, 118a, 118b prior to cellular handoff, which is described in greater detail below with respect to FIGS. 2 and 3. Although not illustrated in FIG. 1A, it is understood that each of the users 114a, 114b, 116, 118a, 118b is associated with a cellular device. The configuration 100a includes the first tower 102, the second tower 104, and the third tower 106. Each of the towers 102, 104, 106 forms one of the cells 108, 110, 112. The first cell 108 is defined by the first tower 102, which may provide service for the plurality of low QoS first users 114a and the high QoS first user 114b. The second cell 110 is defined by the second tower 104, which may provide service for a plurality of low QoS second users 116. The third cell 112 is defined by the third tower 106, which may provide service for the plurality of low QoS third users 118a and two high QoS third users 118b.

In a conventional handoff mechanism, the low QoS first users 114a and the high QoS first user 114b may be associated with the first tower 102 because the low QoS first users 114a and the high QoS first user 114b are nearest to or have the highest signal strength with respect to the first tower 102. The low QoS second users 116 may be associated with the second tower 104 because the low QoS second users 116 are nearest to or have the highest signal strength with respect to the second tower 104. The low QoS third users 118a and the two high QoS third users 118b may be associated with the third tower 106 because the low QoS third users 118a and the high QoS third users 118b are nearest to or have the highest signal strength with respect to the third tower 106. It should be noted that FIG. 1A (and FIG. 1B below) may not be drawn to scale.

As illustrated in FIG. 1A, the first cell 108 includes the high QoS first user 114b, and the third cell 112 includes the high QoS third users 118b. As used herein, a high QoS user, such as the high QoS first user 114b and the high QoS third users 118b, refers to a user desiring or requiring high quality service and/or utilizing a particular service or application which is highly sensitive or vulnerable to QoS conditions. A low QoS user, such as the low QoS first users 114a and the low QoS third users 118a may refer to a user desiring or requiring relatively less quality in their service and/or utilizing a service or application which is less sensitive or vulnerable to QoS conditions. For example, the high QoS first user 114b and the high QoS third users 118b may pay extra fees to a service provider to access real-time video and music streaming content, which may be bandwidth intensive. The high-bandwidth content received by the high QoS first user 114b and the high QoS third users 118b may be degraded because of a large number of the low QoS first users 114a and the low QoS third users 118a in the respective cells 108 and 112. However, it may be noted that the second cell 110 includes only the low QoS second users 116 and no high QoS second users. As such, the second cell 110 may be able to support additional low QoS users, such as the low QoS first users 114a from the first cell 108 and the low QoS third users 118a from third cell 112, without any loss in the QoS for the existing low QoS second users 116. By forcing or encouraging at least a portion of the low QoS first users 114a in the first cell 108 and the low QoS third users 118a in the third cell 112 to handoff to the second cell 110, the load on the first tower 102 and the third tower 106 may be reduced such that QoS for the high QoS first users 114b and the high QoS second users 118b is improved.

The cells 108, 110, 112 of FIG. 1A are illustrated as a Venn diagram to show overlap in the communications coverage provided by the towers 102, 104, 106. In particular, it may be noted that portions of the first cell 108, the second cell 110, and the third cell 112 overlap. In a region 122, the first cell 108 and the second cell 110 overlap. In a region 124, the first cell 108 and the third cell 112 overlap. In a region 126, the second cell 110 and the third cell 112 overlap. In a region 128, the first cell 108, the second cell 110, and the third cell 112 overlap. For the users 114a, 114b, 116, 118a, 118b in these overlapping regions 122, 124, 126, 128, handoff may be performed from one tower to another tower, as illustrated in FIG. 1B.

Figure 1B:
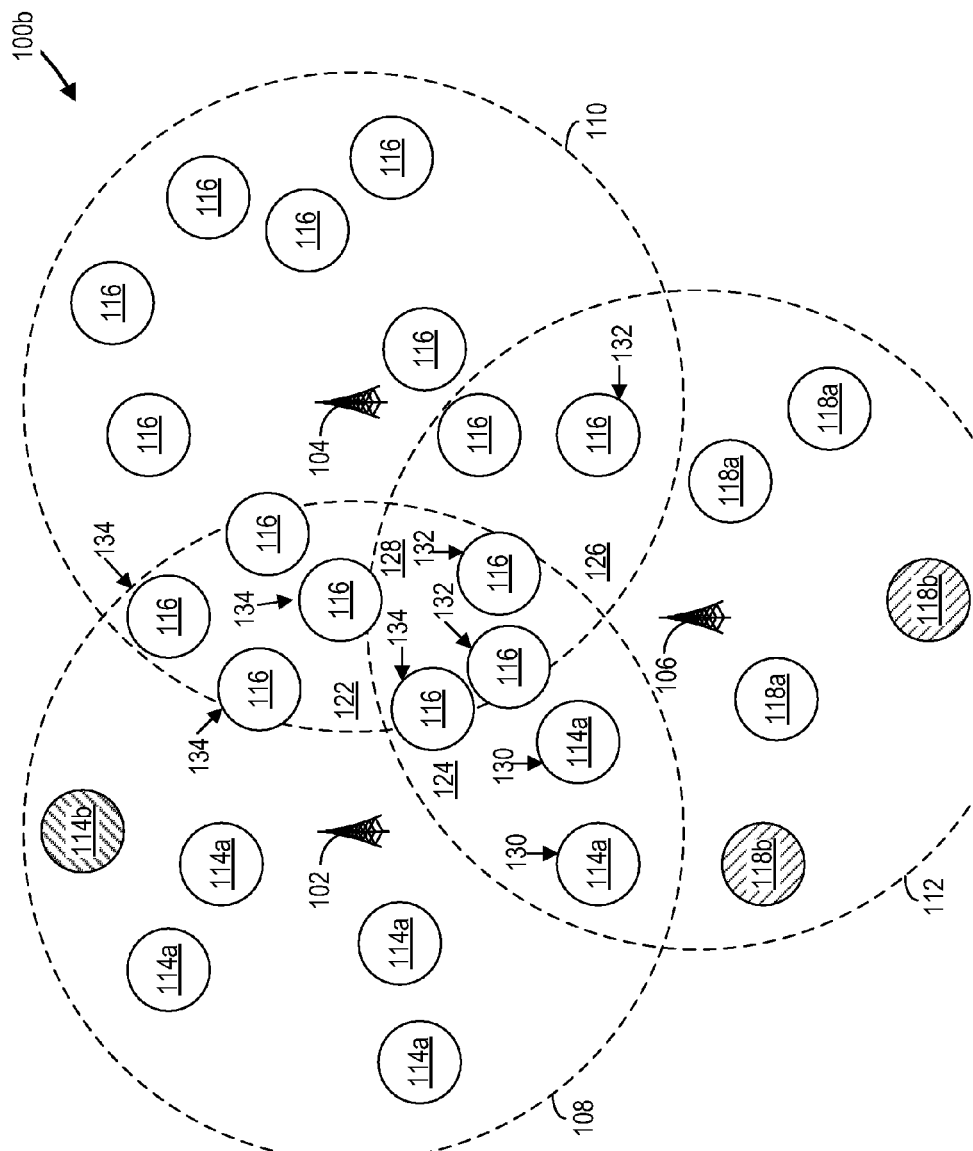
FIG. 1B is a high-level diagram illustrating an exemplary configuration of towers, cells, and users after the cellular handoff illustrated in FIGS. 2 and 3.

FIG. 1B is a diagram illustrating an exemplary configuration 100b of the towers 102, 104, 106, cells 108, 110, 112, and users 114a, 114b, 116, 118a, 118b after cellular handoff, which is described in greater detail below with respect to FIGS. 2 and 3. Referring to FIGS. 1A and 1B, a number of the low QoS first users 114a and the low QoS third users 118a in FIG. 1A have been handed off. In particular, the low QoS third users 118a shown at 130 were handed off from the third tower 106 to the first tower 102, thereby becoming low QoS first users 114a. The low QoS third users 118a shown at 132 were handed off from the third tower 106 to the second tower 104, thereby becoming low QoS second users 116. The low QoS first users 114a shown at 134 were handed off from the first tower 102 to the second tower 104, thereby becoming low QoS second users 116.

Compared to the configuration 110a of FIG. 1A, the configuration 110b of FIG. 1B reduces the number of the low quality first users 114a and the number of low quality third users 118a, thereby reducing the load on first tower 102 and the third tower 106, respectively. In FIG. 1A, the configuration 110a includes eight low QoS first users 114a and eight low QoS third users 118a. On the other hand, in FIG. 1B, the configuration 110b includes a reduction to six low QoS first users 114a and three low QoS third users 118a. With the reduced load, the first tower 102 has more available bandwidth to better service the high QoS first user 114b, and the third tower 106 has more available bandwidth to better service the high QoS third users 118b.

It should be appreciated that the configurations 110a, 110b illustrated in FIGS. 1A and 1B are simplified and merely exemplary. In particular, handoffs are generally not based on physical distances between the users 114a, 114b, 116, 118a, 118b and the cellular towers 102, 104, 106 but rather on signal strength. While the physical distances may affect and is sometimes indicative of signal strength, other factors, such as the presence of buildings and other obstructions as well as the antenna patterns in the cells 108, 110, 112 may also affect signal strength. Further, although not so illustrated in FIGS. 1A and 1B, existing cellular devices may voluntarily drop from the cells 108, 110, 112 and/or new cellular devices may enter the cells 108, 110, 112.

Figure 2:
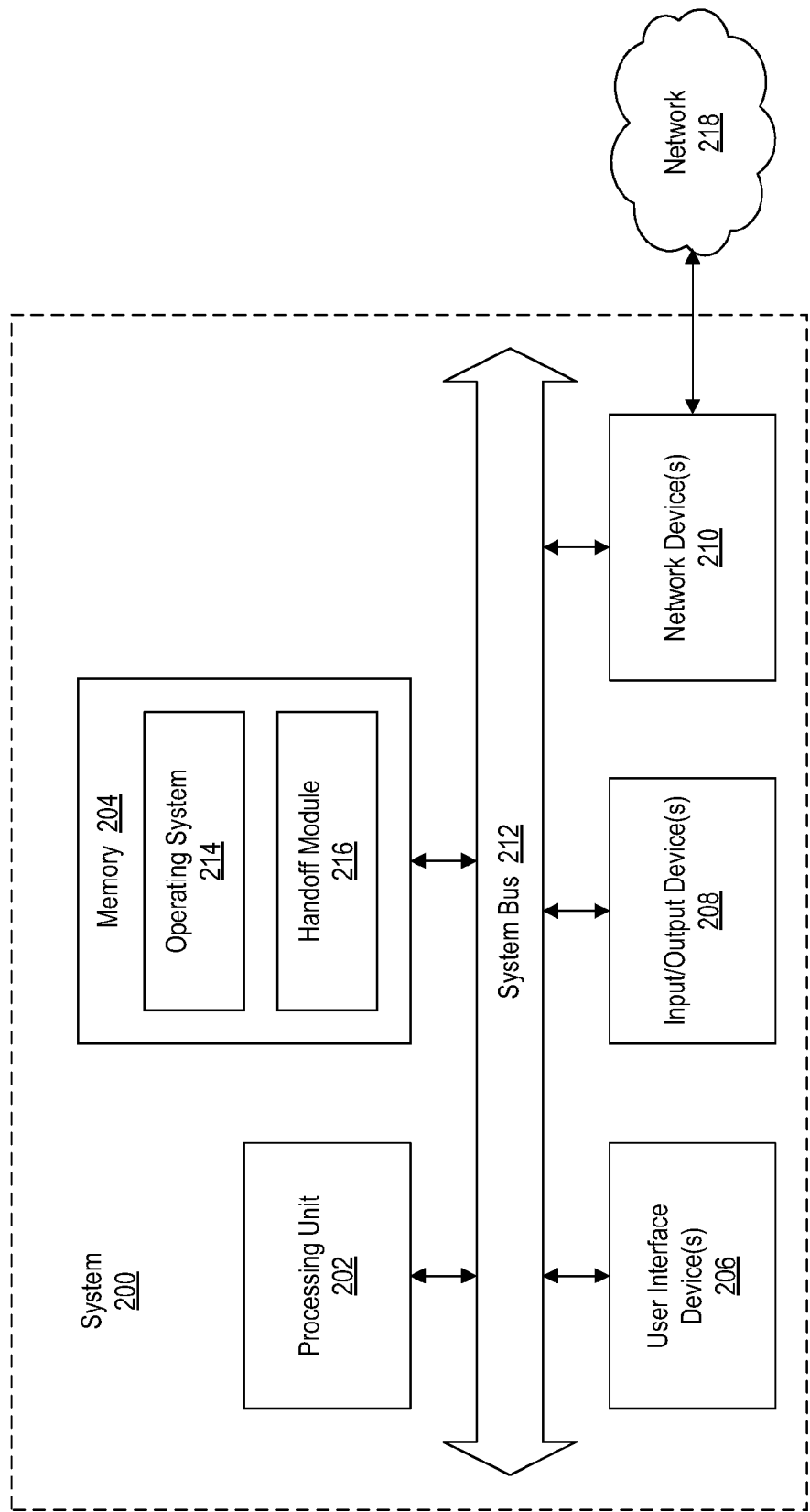
FIG. 2 is a block diagram illustrating a system configured to provide cellular handoff, in accordance with exemplary embodiments.

FIG. 2 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 2 is a block diagram illustrating a system 200 configured to provide cellular handoff, in accordance with exemplary embodiments. The system 200 includes a processing unit 202, a memory 204, one or more user interface devices 206, one or more input/output ("I/O") devices 208, and one or more network devices 210, each of which is operatively connected to a system bus 212. The bus 212 enables bi-directional communication between the processing unit 202, the memory 204, the user interface devices 206, the I/O devices 208, and the network devices 210. Examples of the system 200 include, but are not limited to, computers, servers, personal digital assistants, cellular phones, or any suitable computing devices.

The processing unit 202 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 204 communicates with the processing unit 202 via the system bus 212. In one embodiment, the memory 204 is operatively connected to a memory controller (not shown) that enables communication with the processing unit 202 via the system bus 212. The memory 204 includes an operating system 214 and a handoff module 216, according to exemplary embodiments. Examples of operating systems, such as the operating system 214, include, but are not limited to, WINDOWS and WINDOWS MOBILE operating systems from MICROSOFT CORPORATION, MAC OS operating system from APPLE CORPORATION, LINUX operating system, SYMBIAN OS from SYMBIAN SOFTWARE LIMITED, BREW from QUALCOMM INCORPORATED, and FREEBSD operating system. In one embodiment, the handoff module 216 is embodied in computer-readable media containing instructions that, when executed by the processing unit 202, performs a method for providing cellular handoff, as described in greater detail below with respect to FIG. 3. According to further embodiments, the handoff module 216 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the system 200.

The user interface devices 206 may include one or more devices with which a user accesses the system 200. The user interface devices 206 may include, but are not limited to, computers, servers, personal digital assistants, cellular phones, or any suitable computing devices. The I/O devices 208 enable a user to interface with the handoff module 216. In one embodiment, the I/O devices 208 are operatively connected to an I/O controller (not shown) that enables communication with the processing unit 202 via the system bus 212. The I/O devices 208 may include one or more input devices, such as, but not limited to, a keyboard, a mouse, or an electronic stylus. Further, the I/O devices 208 may include one or more output devices, such as, but not limited to, a display screen or a printer.

The network devices 210 enable the system 200 to communicate with other networks or remote systems via a network 218. Examples of network devices 210 may include, but are not limited to, a modem, a radio frequency ("RF") or infrared ("IR") transceiver, a telephonic interface, a bridge, a router, or a network card. The network 218 may include a wireless network such as, but not limited to, a Wireless Local Area Network ("WLAN") such as a WI-FI™ network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 218 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

In one embodiment, the system 200 is operatively coupled to each of the cellular towers 102, 104, 106 via the network 218 to provide handoff functionality for the respective towers 102, 104, 106. In another embodiment, the system 200 is operatively coupled to two or more of the towers 102, 104, 106. In this case, the system 200 may serve as a central controller for two or more of the cellular towers 102, 104, 106. In yet another embodiment, the system 200 is included in a cellular device. In this case, the cellular devices may operate in conjunction to provide appropriate handoff functionality without utilizing a central controller.

Figure 3:
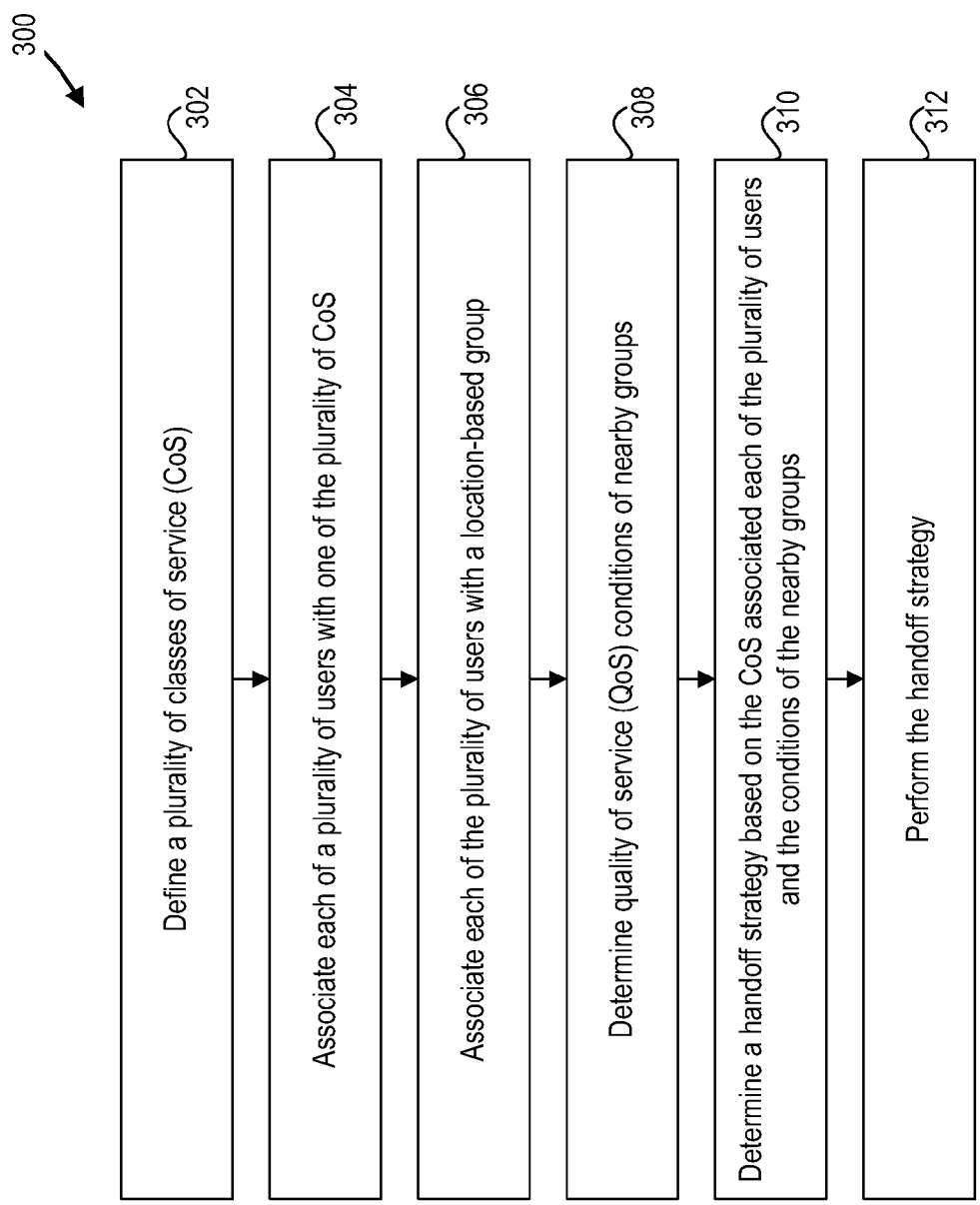
FIG. 3 is a flow diagram illustrating a method for providing cellular handoff, in accordance with exemplary embodiments.

FIG. 3 is a flow diagram illustrating a method 300 for providing cellular handoff, in accordance with exemplary embodiments. According to the method 300, the handoff module 216 defines (at 302) a plurality of classes of service ("CoS"). The plurality of CoS may be defined based on the users 114a, 114b, 116, 118a, 118b, the cellular devices associated with the users 114a, 114b, 116, 118a, 118b, the application programs being executed by the cellular devices, or any combination thereof. In one embodiment, the plurality of CoS are defined based on the level of QoS to which the users 114a, 114b, 116, 118a, 118b are subscribed. For example, the low QoS first users 114a, the low QoS second users 116, and the low QoS third users 118a may be subscribed to a lower level of QoS (e.g., regular service) that, for example, does not include content, such as high bandwidth content, that is highly sensitive to QoS. The high QoS first user 114b and the high QoS third users 118b may be subscribed to a higher level of QoS (e.g., premium service) that does includes, for example, high-bandwidth content. Other examples of services and applications that are sensitive to QoS may include, but are not limited to, services and applications requiring high bandwidth, low latency or delay, low jitter, low packet loss, and combinations thereof. It should be appreciated that the different CoS may reflect varying or progressive degrees of QoS sensitivity.

The handoff module 216 associates (at 304) each of the users 114a, 114b, 116, 118a, 118b to one of the plurality of CoS. In further embodiments, the handoff module 216 may associate each of the cellular devices associated with the users 114a, 114b, 116, 118a, 118b or each of the application programs executed by the cellular devices to one of the plurality of CoS. As illustrated in FIGS. 1A and 1B, the handoff module 216 may associate the low QoS first users 114a, the low QoS second users 116, and the low QoS third users 118a to a low QoS CoS. The handoff module 216 may further associate the high QoS first user 114b and the high QoS third user 118b to a high QoS CoS. It should be appreciated that the high QoS CoS and the low QoS Cos described herein are only exemplary. In further embodiments, any suitable CoS may be utilized.

In one embodiment, the associations between the users 114a, 114b, 116, 118a, 118b and the plurality of CoS may be static. For example, the associations may be determined based on static information, such as preferences, profiles, service purchases, and the like, associated with the users 114a, 114b, 116, 118a, 118b. In a further embodiment, the associations between the users 114a, 114b, 116, 118a, 118b and the plurality of CoS may be dynamic. In one embodiment, the associations may change because the real-time QoS needs for the users 114a, 114b, 116, 118a, 118b depend on changing conditions. For example, the users 114a, 114b, 116, 118a, 118b may access high-bandwidth content at an unexpected time. Thus the association of the users 114a, 114b, 116, 118a, 118b to a particular CoS may change for a variety of reasons and at any time, including for example, when the user closes one application which may be QoS-sensitive and opens another application which may be less QoS-sensitive, or vice versa.

Referring again to FIG. 3, the handoff module 216 associates (at 306) the users 114a, 114b, 116, 118a, 118b into location-based groups. In one embodiment, the location-based groups are cells, such as the cells 108, 110, 112. The area covered by the cells 108, 110, 112 may not be mutually-exclusive, resulting in overlap between two or more of the cells 108, 110, 112, as illustrated in FIGS. 1A and 1B. For each of the location-based groups, the handoff module 216 determines (at 308) real-time QoS conditions of nearby groups (e.g., the cells 108, 110, 112) to which the users 114a, 114b, 116, 118a, 118b may be handed off. As previously described, the QoS conditions may include, but are not limited to, bandwidth limitations, jitter, delay and latency, packet loss, interference, and combinations thereof. For example, referring to FIG. 1A, the eight low QoS third users 118a of the third cell 112 may affect the QoS provided to the two high QoS third users 118b of the third cell 112. The handoff module 216 may determine, however, that the second cell 110 has no high QoS users and is therefore capable of servicing additional low QoS users, such as the low QoS third users 118a, that may be handed off from the third cell 112.

For one or more of the users 114a, 114b, 116, 118a, 118b, the handoff module 216 determines (at 310) a handoff strategy based on the CoS associated with the users 114a, 114b, 116, 118a, 118b and the condition of the groups (e.g., the cells 108, 110, 112) near the users 114a, 114b, 116, 118a, 118b. The handoff strategy may include which of the users 114a, 114b, 116, 118a, 118b that the handoff module 216 can force or encourage to handoff, which of the cells 108, 110, 112 to where the handoff can be made, which of the users 114a, 114b, 116, 118a, 118b can be forced or encouraged by the handoff module 216 to handoff may be based on which of the users 114a, 114b, 116, 118a, 118b are located in areas of overlapping cellular service, such as the overlapping regions 122, 124, 126, 128. It should be appreciated by those skilled in the art that the determination of which users 114a, 114b, 116, 118a, 118b can be forced or encouraged to handoff may further be based on service selected by the user 114a, 114b, 116, 118a, 118b. For example, the user 114a, 114b, 116, 118a, 118b may purchase a service that prohibits handoffs that would be detrimental to the service. The handoff strategy may be optimized to provide better QoS for the users 114a, 114b, 116, 118a, 118b associated with at least some of the CoS. For example, the handoff strategy may be optimized to provide better QoS for the higher QoS users, such as the high QoS first user 114b and the high QoS third users 118b.

In one embodiment, the handoff strategy is based on handing off at least a portion of the users 114a, 114b, 116, 118a, 118b from a cell with worse QoS conditions to a cell with better QoS conditions, thereby balancing the QoS conditions between the cells. In a further embodiment, the handoff strategy is based on handing off at least a portion of the users 114a, 114b, 116, 118a, 118b from a cell to increase available bandwidth or otherwise improve QoS conditions in the cell. In this case, the handoff strategy may disregard the QoS received by the users 114a, 114b, 116, 118a, 118b handed off from the cell for the benefit of helping those that remain in the cell. For example, the users 114a, 114b, 116, 118a, 118b may be handed off to a cell with worse QoS conditions. While this example may seem counter-intuitive to the conventional notion of providing the best QoS to all of the users 114a, 114b, 116, 118a, 118b, a service provider may decide that providing better QoS for the users 114b, 118b associated with a higher level of CoS may be in its best interest even at the expense of providing lesser QoS, and even actively diminishing the QoS experienced, for the users 114a, 116, 118a associated with a lower level of CoS.

In one embodiment, the handoff module 216 may determine a plurality of handoff strategies. The plurality of handoff strategies may be analyzed and ranked according to any suitable criteria. In one example, the handoff strategies may be analyzed and ranked based on the anticipated QoS conditions resulting from performing the handoff strategies. In a further example, the handoff strategies may be analyzed and ranked based on the feasibility of performing the handoff strategies with respect to any suitable operational rules and thresholds.

The handoff module 216 performs (at 312) the handoff strategy. The handoff strategy may be forced upon or encouraged to the users 114a, 114b, 116, 118a, 118b. In one embodiment, the handoff module 216 forces the users 114a, 114b,

116, 118a, 118b to perform the handoff strategy by transmitting a handoff command to the cellular devices associated with the users 114a, 114b, 116, 118a, 118b. In a further embodiment, the handoff module 216 encourages the users 114a, 114b, 116, 118a, 118b to perform the handoff strategy by introducing biases to the users 114a, 114b, 116, 118a, 118b via, for example, a parameter update to the cellular devices associated with the users 114a, 114b, 116, 118a, 118b.

In one embodiment, the QoS resulting from performing the handoff strategy may be monitored to assure globally optimized QoS for all of the users 114a, 114b, 116, 118a, 118b commensurate with their QoS needs. In a further embodiment, the QoS resulting from performing the handoff strategy may be monitored to assure business-optimized QoS for higher classes of users, such as the high QoS first user 114b and the high QoS third users 118b, who subscribe to premium services. One or more of the operations at 302, 304, 306, 308, and 310 may be repeated if the QoS resulting from performing the handoff strategy is not satisfactory.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for providing cellular handoff, comprising:
associating a group of first users with a first subscribed quality of service;
associating a first group of second users and a second group of second users with a second subscribed quality of service, the second subscribed quality of service lower than the first subscribed quality of service;
assigning the group of first users with the first subscribed quality of service and the first group of second users with the second subscribed quality of service to a first cellular tower;
assigning the second group of second users with the second subscribed quality of service to a second cellular tower;
determining a real-time quality of service provided by the first cellular tower to the group of first users;
determining whether the real-time quality of service provided by the cellular tower to the group of first users falls below the first subscribed quality of service; and
in response to determining that the real-time quality of service provided by the first cellular tower to the group of first users falls below the first subscribed quality of service, performing a handoff of the first group of second users from the first cellular tower to the second cellular tower even when the handoff causes a second real-time quality of service provided by the second cellular tower to the first group of second users to fall below the second subscribed quality of service.

2. The method of claim 1, wherein determining a real-time quality of service provided by the first cellular tower to the group of first users comprises determining the real-time quality of service provided by the first cellular tower to the group of first users based on a load placed on the first cellular tower.

3. The method of claim 1, wherein performing a handoff of the first group of second users from the first cellular tower to the second cellular tower comprises forcing the handoff of the first group of second users from the first cellular tower to the second cellular tower.

4. The method of claim 1, wherein performing a handoff of the first group of second users from the first cellular tower to the second cellular tower comprises encouraging the handoff of the first group of second users from the first cellular tower to the second cellular tower by increasing a likelihood that the handoff will occur.

5. A system for providing a cellular handoff, comprising:
a memory for storing a program containing code for providing the cellular handoff;
a processor functionally coupled to the memory, the processor being responsive to computer-executable instructions contained in the program and operative to:
associate a group of first users with a first subscribed quality of service,
associate a first group of second users and a second group of second users with a second subscribed quality of service, the second subscribed quality of service lower than the first subscribed quality of service,
assign the group of first users with the first subscribed quality of service and the first group of second users with the second subscribed quality of service to a first cellular tower;
assign the second group of second users with the second subscribed quality of service to a second cellular tower,
determine a real-time quality of service provided by the first cellular tower to the group of first users,
determine whether the real-time quality of service provided by the first cellular tower to the group of first users falls below the first subscribed quality of service, and
in response to determining that the real-time quality of service provided by the first cellular tower to the group of first users falls below the first subscribed quality of service, perform a handoff of the first group of second users from the first cellular tower to the second cellular tower even when the handoff causes a second real-time quality of service provided by the second cellular tower to the first group of second users to fall below the second subscribed quality of service.

6. The system of claim 5, wherein to determine a real-time quality of service provided by the first cellular tower to the group of first users, the processor is further operative to:
determine the real-time quality of service provided by the first cellular tower to the group of first users based on a load placed on the first cellular tower.

7. The system of claim 5, wherein to perform a handoff of the first group of second users from the first cellular tower to the second cellular tower, the processor is further operative to:
encourage the handoff of the first group of second users from the first cellular tower to the second cellular tower by increasing a likelihood that the handoff will occur.

8. A non-transitory computer-readable medium having instructions stored thereon for execution by a processor to provide cellular handoff, the instructions causing the processor to perform the following:
associating a group of first users with a first subscribed quality of service;
associating a first group of second users and a second group of second users with a second subscribed quality of service, the second subscribed quality of service lower than the first subscribed quality of service;

assigning the group of first users with the first subscribed quality of service and the first group of second users with the second subscribed quality of service to a first cellular tower;

assigning the second group of second users with the second subscribed quality of service to a second cellular tower;

determining a real-time quality of service provided by the first cellular tower to the group of first users;

determining whether the real-time quality of service provided by the first cellular tower to the group of first users falls below the first subscribed quality of service; and in response to determining that the real-time quality of service provided by the first cellular tower to the group of first users falls below the first subscribed quality of service, performing a handoff of the first group of users from the first cellular tower to the second cellular tower even when the handoff causes a second real-time quality of service provided by the second cellular tower to the first group of second users to fall below the second subscribed quality of service.

9. The non-transitory computer-readable medium of claim 8, wherein determining a real-time quality of service provided by the first cellular tower to the group of first users comprises determining the real-time quality of service provided by the first cellular tower to the group of first users based on a load placed on the first cellular tower.

10. The non-transitory computer-readable medium of claim 8, wherein performing a handoff of the first group of second users from the first cellular tower to the second cellular tower comprises forcing the handoff of the first group of second users from the first cellular tower to the second cellular tower.

11. The non-transitory computer-readable medium of claim 8, wherein performing a handoff of the first group of second users from the first cellular tower to the second cellular tower comprises encouraging the handoff of the first group of second users from the first cellular tower to the second cellular tower.

* * * * *